United States Patent [19]

Neefe

[11] Patent Number: 4,710,328

[45] Date of Patent: * Dec. 1, 1987

[54] METHOD OF MAKING AN EYE COLOR CHANGE CONTACT LENS

[76] Inventor: Charles W. Neefe, 811 Scurry St., Big Spring, Tex. 79720

[*] Notice: The portion of the term of this patent subsequent to Dec. 1, 2004 has been disclaimed.

[21] Appl. No.: 876,790

[22] Filed: Jun. 20, 1986

Related U.S. Application Data

[63] Continuation-in-part of Ser. No. 832,381, Feb. 24, 1986, abandoned.

[51] Int. Cl.[4] ............................................. B29D 11/00
[52] U.S. Cl. ...................... 264/1.7; 264/2.7; 351/162; 425/808
[58] Field of Search .............. 264/1.1, 1.7, 2.7, 2.1; 425/808; 351/162, 165, 160 R, 160 H

[56] References Cited

U.S. PATENT DOCUMENTS

| 3,189,914 | 6/1965 | Guscwitch et al. | 351/162 |
| 3,270,099 | 8/1966 | Camp | 264/1.8 |
| 3,560,598 | 2/1971 | Neefe | 264/1.8 |
| 3,984,506 | 10/1976 | Isvetaki | 264/1.8 |
| 4,460,523 | 7/1984 | Neefe | 264/1.1 |

FOREIGN PATENT DOCUMENTS 356832  9/1931  United Kingdom ............... 351/165

Primary Examiner—James Lowe

[57] ABSTRACT

A cosmetic contact lens is made by providing an iris segment piece shaped from a polymer having a daylight fluorescent colorant dispersed on it and which has a cone shaped depression in its center. A colored transparent monomer is polymerized in this depression. The iris segment piece also has a convex cone shaped periphery that is filled in with a clear transparent monomer which is then polymerized. A contact lens is cut from the thus formed cylinder to form a contact lens having a colored transparent pupil area, a daylight fluorescent iris area and a clear transparent peripheral area.

7 Claims, 5 Drawing Figures

METHOD OF MAKING AN EYE COLOR CHANGE CONTACT LENS

This is a continuation-in-part of application 832,381 entitled, "EYE COLOR CHANGE CONTACT LENS BLANK", filed Feb. 24, 1986 by Charles W. Neefe, and now abandoned.

The desire to change and enhance the apparent color of the eye was recorded by the Egyptians five thousand years ago. Cosmetic makeup for the eye area accounts for the larger percentages of the cosmetic sales today.

PRIOR ART

Several contact lenses have been produced in an effort to achieve cosmetic eye color change.

One attempt employed a laminated structure with a painted opaque plastic member. The result was a thick heavy lens which was difficult to fabricate and difficult to wear. A later attempt employed a colored opaque plastic porous member surrounding a clear cylinder from which the lens was cut by lathing. This resulted in a lens having a pupil and iris pattern and the porous member had tendencies to flake and chip at the edge. (U.S. Pat. No. 3,454.332—Siegel).

A third generation of colored lenses provided a thin layer of colored opaque markings placed in a clear material. The opaque colored markings radiated from the center of the clear material in geometric pattern.

U.S. Pat. Nos. Neefe, 4,460,523 and 4,472,327, describe methods of making cosmetic contact lenses wherein the lens segments are joined vertically through the lens.

Fuhrman, international publication, No. WO83/03480, October 1983 descloses a cosmetic lens having horizontal color laminations.

SUBJECT OF THE INVENTION

The present invention is a cosmetic contact lens made from a three layered cosmetic contact lens blank. The three cone shaped segments are laminated together by polymerizing the cone shaped layers, one upon the other. The interface between the three layers is a truncated cone or a cone. A cosmetic lens having a concave curvature which intersects all three layers of the blank is cut from the cosmetic blank.

The size of the central pupil and the iris area of the lens is controlled by the depth the concave surface is cut into the blank. A blank cut to a thin center thickness will have a larger pupil and iris area than a blank cut to thicker center thickness.

The addition of daylight flrorescent colorants, which fluoresce visibily in the light of day, to the ocular cosmetic lens adds a new and striking appearance to the eye not previously known.

Daylight fluorescent colorants are transparent organic dyes which are capable of visibily fluorescing in the daylight while in a solid state solution.

Certian substances, especially a number of organic dyes, have the property of fluorescing under visible light at the blue and green regions of the visible spectrum. Ultraviolet light is not required. The fluorescence of these organic dyes is associated with the individual dye molecules; in order for them to fluoresce efficiently, they must dissolved in fairly low concentrations in a solvent for the dyes. Due to the nature of the dyes used, it is necessary to have an organic medium or carrier to put them into solution. The type of material which meets the requirements for a carrier matrix for the dyes is an organic hydrophilic resin.

The physical structure of the fluorescent colorants is amorphous, or non crystalline. In contrast to most other colorants, they are not formed by precipitation and do not consist of particle agglomerates.

Daylight fluorescent colorants are stable to indoor light or conditions of outdoor light other than extended exposure to direct light.

It is possible to mix more than one fluorescent colorant and non-fluorescent colorants in the same formula, to obtain intermediate hues.

Daylight fluorescence is greatly increased when the fluorescent colorant is in a hydrophilic matrix. Water in the hydrophilic material increases the fluorescence up to 300 percent. Water blocks infrared and transmits the green and blue wavelength which activate the fluorescent material. The water is in physical contact with the dye molecules and the hydrophilic lens material, thus increasing the light transmission efficiency to and from the lens.

The ability to fluoresce visibily under bright daylight conditions and radiates colored light which emanates from within the lens provides a color enhancement of the eye not previously known or possible.

IN THE DRAWING

THE LENS IS MADE AS FOLLOWS

Figure 1:
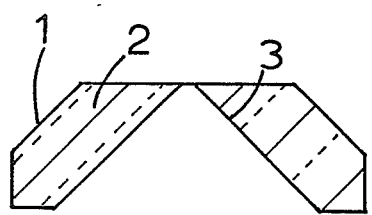
FIG. 1 shows the colored iris segment in section.
Figure 2:
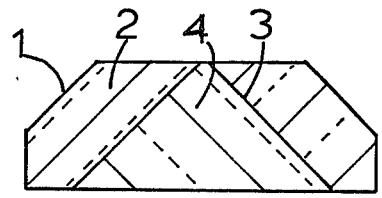
FIG. 2 shows the iris segment and pupil segment in section.

An iris segment piece, FIG. 1, is shaped from a polymer having a daylight fluorescent colorant dispersed through the piece. A central concave cone, 2 FIG. 1, is provided. An exterior convex cone, 1 FIG. 1, is also provided. The concave cone, 3 FIG. 2, is filled with colored transparent pupil material, 4 FIG. 2. The cosmetic lens blank is completed by adding clear transparent lens material, 5 FIG. 1, to the convex cone surface, 1 FIG. 3. The convex cone, 1 FIG. 1, is a truncated cone. The concave cone, 3 FIG. 1, may either be a complete cone with an apex or a truncated one.

THE COSMETIC LENS IS MADE AS FOLLOWS

Figure 4:
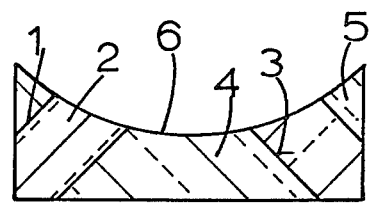
FIG. 4 shows the blank with the concave surface cut in section.

A concave lens curve, 6 FIG. 4, is cut. The concave curve, 6 FIG. 4, intersects the central concave cone, 4 FIG. 4, providing the lens pupil area. The deeper into the blank curve, 6 FIG. 4, is cut the larger the pupil area will become. A thinner blank center thickness results in a larger lens pupil area.

The iris area becomes larger the deeper the concave curve 6 FIG. 4, is cut into the blank. A thinner blank center thickness provided a larger pupil and iris area. The shape of the cone surfaces, 1 and 3 FIG. 1, allows the pupil and iris size to increase at a constant rate as the concave curve, 6 FIG. 4, is cut deeper into the blank. The constant progression enables the lens to be made with larger or smaller pupil and iris areas to conform to the needs of the wearer. The lens is completed by cutting the convex lens curve, 7 FIG. 5. The concave and convex curves intersect the clear transparent peripheral area, 5 FIG. 5, the iris colored fluorescent area, 2 FIG.

Figure 5:
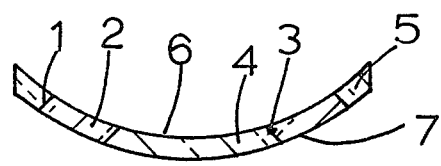
FIG. 5 shows the finished cosmetic lens in section.

5, and the colored transparent pupil area, 4 FIG. 5. The clear periphery, 5 FIG. 5, and the iris area, 2 FIG. 5, are seperated by the cone segment, 3 FIG. 5. The iris area, 2 FIG. 5, and the pupil area, 4 FIG. 5, are seperated by the cone segment, 3 FIG. 5.

The lens iris segment area, 2 FIGS. 1,2,3,4 and 5 is fluorescent, translucent, opaque or contains suspended pigment particles.

The pupil area, 4 FIGS. 2,3,4 and 5, is transparent and colored or colorless.

Figure 3:
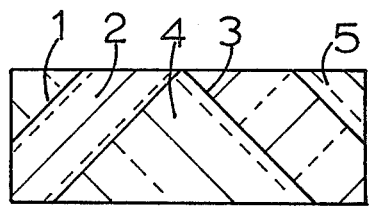
FIG. 3 shows the completed cosmetic blank in section.

The clear peripheral area, 5 FIGS. 3, 4 and 5, is used when soft contact lenses which are larger than the natural iris are made. The clear peripheral segment may be omitted for lenses the size of the natural iris or smaller.

The advantages of this method is that cosmetic lenses having larger or smaller pupil and iris can be made from one blank by controlling the depth the concave curve is cut into the cosmetic lens blank.

The double cone iris segment shown in FIG. 1 can be produced by molding. This fact makes reproducible blanks possible at a low cost.

Various modification can be made without departing from the spirit of this invention or the scope of the appended claims. The constants set forth is this disclosure are given as examples and are in no way final or binding. In view of the above, it will be seen that the several objects of the invention are achieved and other advantages are obtained. As many changes could be made in the above constructions and methods without departing fro the scope of the invention, it is intended that all matter contained in the above description shall be interpreted as illustrative and not in a limiting sense.

I claim:

1. A method of making a cosmetic contact lens that changes the apparent color of the eye by the steps of providing a colored daylight fluorescent polymer having a central concave cone shaped depression, and a peripheral convex cone shape, filling the cone shaped central depression with a colored transparent monomer, polymerising the monomer to form a colored transparent polymer, filling the peripheral convex cone shaped area with a clear transparent monomer, polymerizing the monomer to form a clear transparent polymer, to form the cosmetic contact lens blank, cutting a concave lens surface that intersects, (1) the central cone shaped colored transparent polymer to form the pupil area and intersects, (2) the colored daylight fluorescent polymer to form the lens iris area, and intersects (3) the clear peripheral cone area to form a clear transparent peripheral lens area, cutting a convex lens surface to provide a cosmetic contact lens having a transparent colored pupil lens area, a daylight fluorescent iris lens area and a clear transparent peripheral lens area.

2. The subject matter of claim 1 wherein the cosmetic lens is a hard lens.

3. The subject matter of claim 1 wherein the cosmetic lens is a soft lens.

4. The subject matter of claim 1 wherein a fluorescent and non-fluorescent colorant is present.

5. The subject matter of claim 1 wherein the size of the lens pupil and iris area are larger when the concave contact lens curvature is cut deeper into the cosmetic lens blank.

6. The subject matter of claim 1 wherein the lens pupil and iris area are smaller when the concave contact lens curve is cut shallower into the cosmetic lens blank.

7. The subject matter of claim 1 wherein the fluorescent or non-fluorescent colorants are added to the lens.